US 6,637,762 B2
United States Patent
Bublies et al.
Date of Patent: Oct. 28, 2003

(54) AXLE SUSPENSION FOR RIGID AXLES OF VEHICLES

(75) Inventors: Holger Bublies, Osnabrück (DE); Reinhard Buhl, Bohmte (DE); Uwe Cossmann, Tecklenburg (DE); Reinhard Richter, Bohmte (DE); Werner Schmudde, Bersenbrück (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 65 days.

(21) Appl. No.: 09/913,654

(22) PCT Filed: Dec. 21, 2000

(86) PCT No.: PCT/DE00/04621
§ 371 (c)(1),
(2), (4) Date: Aug. 15, 2001

(87) PCT Pub. No.: WO01/45972
PCT Pub. Date: Jun. 28, 2001

(65) Prior Publication Data
US 2002/0125673 A1 Sep. 12, 2002

(30) Foreign Application Priority Data
Dec. 22, 1999 (DE) ......................................... 199 62 406

(51) Int. Cl.[7] .................................................. B60G 9/00
(52) U.S. Cl. ............................ 280/124.11; 280/124.157
(58) Field of Search .................... 280/124.11, 124.109, 280/124.1, 124.156, 124.157, FOR 159

(56) References Cited

U.S. PATENT DOCUMENTS 2,746,766 A * 5/1956 Nallinger
5,649,719 A * 7/1997 Wallace et al.

FOREIGN PATENT DOCUMENTS

| DE | 25 05 124 A | 8/1976 |
|---|---|---|
| DE | 195 19 694 A | 12/1996 |
| DE | 195 21 874 A | 12/1996 |
| EP | 0 430 368 A | 6/1991 |
| GB | 1 382 215 A | 1/1975 |

* cited by examiner

Primary Examiner—Eric Culbreth
(74) Attorney, Agent, or Firm—McGlew and Tuttle, P.C.

(57) ABSTRACT

An axle suspension for rigid axles of vehicles, especially air-cushioned utility vehicles includes a twistable fur-point connecting rod (4) connected above the vehicle axle (3) to the (vehicle axle (3). The twistable four-point connect rod (4) is connected to the vehicle chassis (1a, 1b, 2a, 2b) via two said joints (5, 6, 7, 8) each, which are arranged at spaced locations from one another in the longitudial direction of the vehicle. At least one spring assembly unit (19, 20) per vehicle side is located for spring suspension between the vehicle axle (3) and the vehicle chassis (1a, 1b, 2a, 2b). An axle strut (21) for axle guiding, extends approximately in the middle of the vehicle in the longitudinal direction of the vehicle and connects the vehicle axle (3) to the vehicle chassis (1a, 1b, 2a, 2b) in a vertically movable manner.

18 Claims, 7 Drawing Sheets

AXLE SUSPENSION FOR RIGID AXLES OF VEHICLES

FIELD OF THE INVENTION

The present invention pertains to an axle suspension for rigid axles of vehicles, especially of air-cushioned utility vehicles.

BACKGROUND OF THE INVENTION

Axle suspensions that contain a four-point connecting rod have been known, e.g., from DE 195 21 874 A1. The design embodiment of such axle suspensions is, in principle, simple, compact and cost-saving and has proved to be definitely successful in practice. However, this axle suspension, like other designs known from the state of the art, has the drawback that numerous components are necessary for axle guiding, which requires an increased assembly effort and also adversely affects the overall weight of the vehicle. Furthermore, prior-art axle suspensions are sometimes kinematically redundant. This in turn leads to an undefined course of kinematic processes within the axle construction in certain situations, which has an adverse effect on the coordination of the chassis or the chassis dynamics in the vertical and lateral directions under certain circumstances.

SUMMARY AND OBJECTS OF THE INVENTION

The technical object of the present invention is to improve an axle suspension such that the kinematic conditions are improved in order to optimize the dynamics of the vehicle movement. Moreover, the number of the individual components shall be further reduced.

According to the invention, an axle, suspension for rigid axles of vehicles, especially air-cushioned utility vehicles is provided with a twistable four-point connecting rod connected both above the vehicle axle to the vehicle axle and to the vehicle body via two joints each, which are arranged at spaced locations from one another in the longitudinal direction of the vehicle. At least one spring assembly unit per vehicle side is located for springing between the vehicle axle and the vehicle body. An axle strut for axle guiding extends approximately centrally of the vehicle in the longitudinal direction of the vehicle and connects the vehicle axle to the vehicle body in a vertically movable manner.

Thus, an axle suspension according to the present invention comprises a twistable four-point connecting rod, which is arranged above the vehicle axle and is connected to the vehicle axle, on the one hand, and to the vehicle body, on the ether hand, via two joints located at spaced locations from one another in the transverse direction of the vehicle.

In addition, at least one spring assembly unit is arranged between the vehicle axle and the vehicle body on each side of the vehicle.

The fact that only one axle strut, which extends in the longitudinal direction approximately in the middle of the vehicle and connects the vehicle axle to the vehicle body in a vertically movable manner, is used, can be considered to be the peculiar feature of such an axle suspension. The axle strut is arranged on the side of the vehicle axle located opposite the four-point connecting rod. The mounting of the four-point connecting rod and the axle strut in the reverse arrangement is, of course, within the scope of the present invention.

The kinematic conditions of the axle suspension are simplified and optimized by such a design. The number of components decreases considerably, so that the axle structure as a whole is less expensive than designs known hitherto.

Thus, the spring assembly units or the shock absorbers are mounted according to the present invention on longitudinal beams, which in turn have a connection to the vehicle axle, so that there is an indirect connection between the vehicle axle and the vehicle body. It has proved to be particularly advantageous for each longitudinal beam to have at least one mount for the spring assembly units. The longitudinal beams are now arranged extending on each side of the vehicle approximately in the longitudinal direction of the vehicle and may accommodate one or more spring assembly units as well as also shock absorbers if necessary. For mounting the spring assembly units and the shock absorbers, the mounts may be designed as joints, and ball-and-socket joints may also be used for this purpose according to a special embodiment of the present invention. The ball-and-socket joints have the advantage of ensuring an easily movable mounting of the corresponding assembly units, so that the pneumatic spring bellows are loaded to an extremely low extent only, e.g., in the case of the use of pneumatic springs.

The components of the vehicle body include according to the present invention at least two parallel longitudinal frames, which are connected to one another by crossbeams located at spaced locations from one another approximately in the transverse direction of the vehicle.

The axle strut for axle guiding, which extends in the longitudinal direction of the vehicle approximately in the middle of the vehicle and connects the vehicle axle to the vehicle body in a vertically movable manner, may be connected to one of the crossbeams by means of a carrier bracket in another embodiment of the present invention. Quite generally, a carrier bracket is defined as a mounting device, which accommodates a molecular joint of the axle strut, on the one hand, and is fixed to the vehicle body, on the other hand. The axle strut preferably has a molecular joint at each of its ends.

To achieve optimal springing of the vehicle axle, the spring assembly unit may be arranged in front of or behind the vehicle axle or in front or and behind the vehicle axle in an axle suspension according to the present invention.

Exemplary embodiments of the subject of the present invention will be explained in greater detail below on the basis of the drawings attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
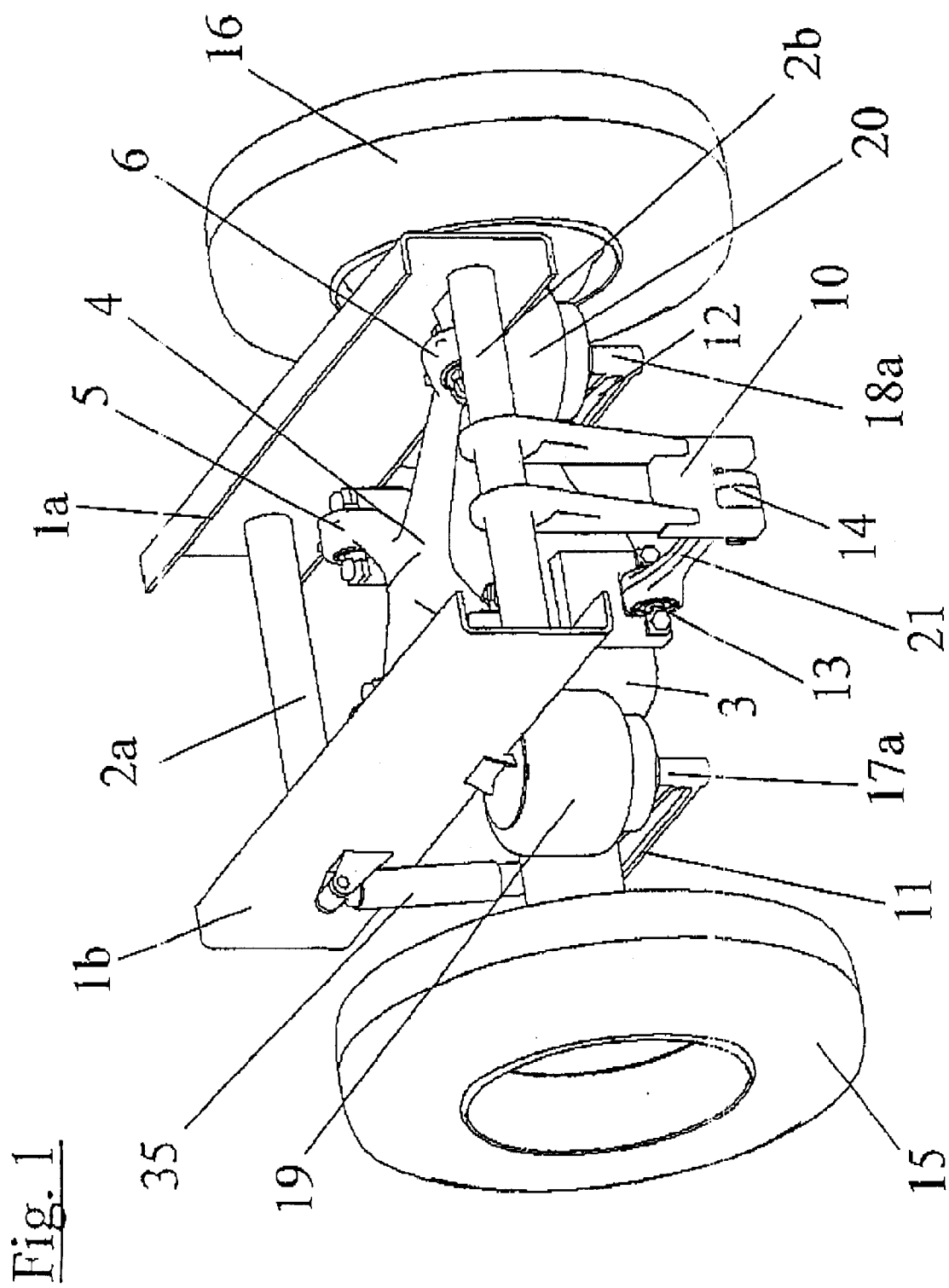
FIG. 1 is a perspective view of an exemplary embodiment of the axle suspension according to the present invention as viewed obliquely from the front, i.e., opposite the direction of travel of the vehicle.
Figure 2:
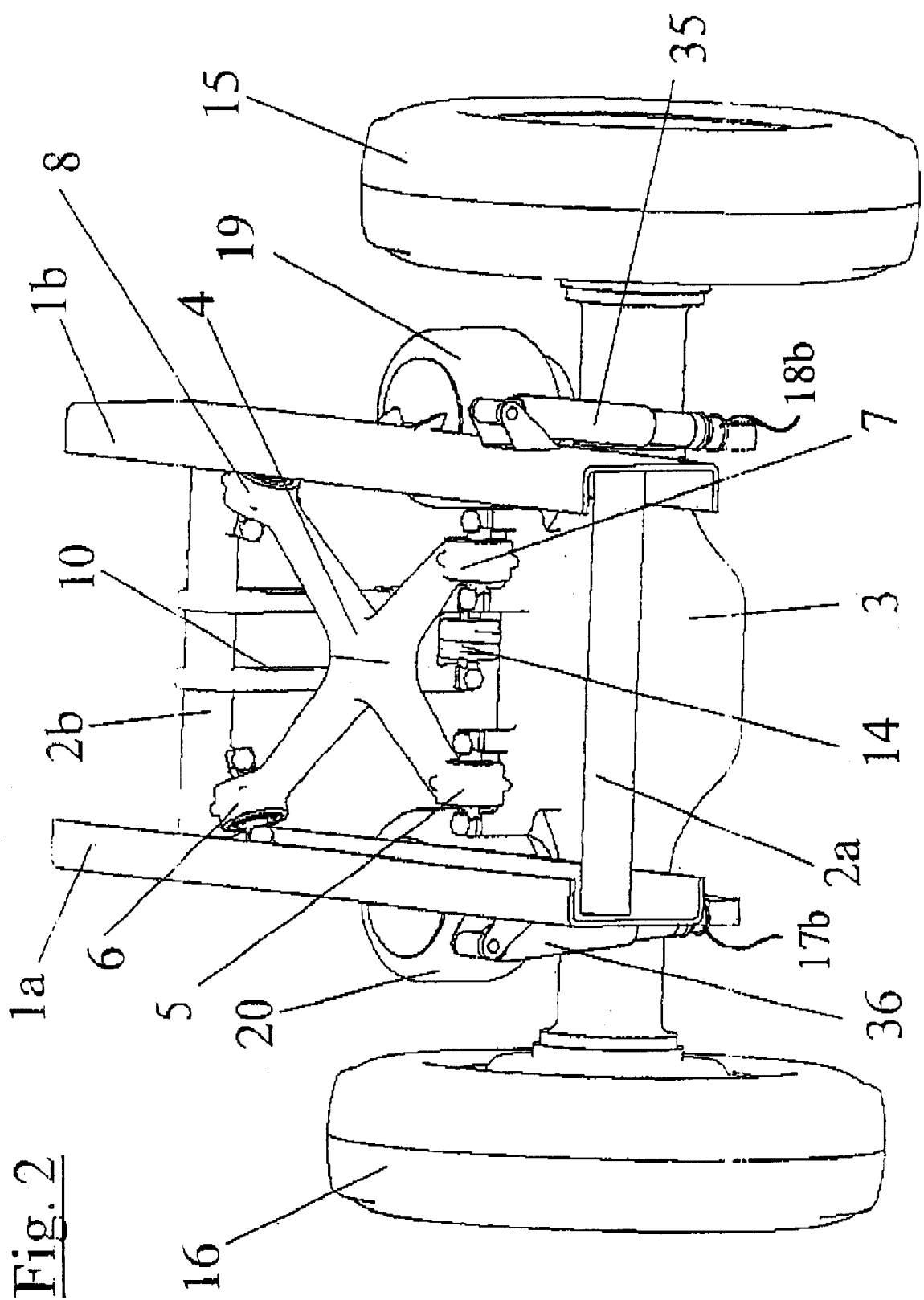
FIG. 2 is a perspective view as viewed obliquely from the rear, i.e., in the direction of travel of the vehicle.
Figure 3:
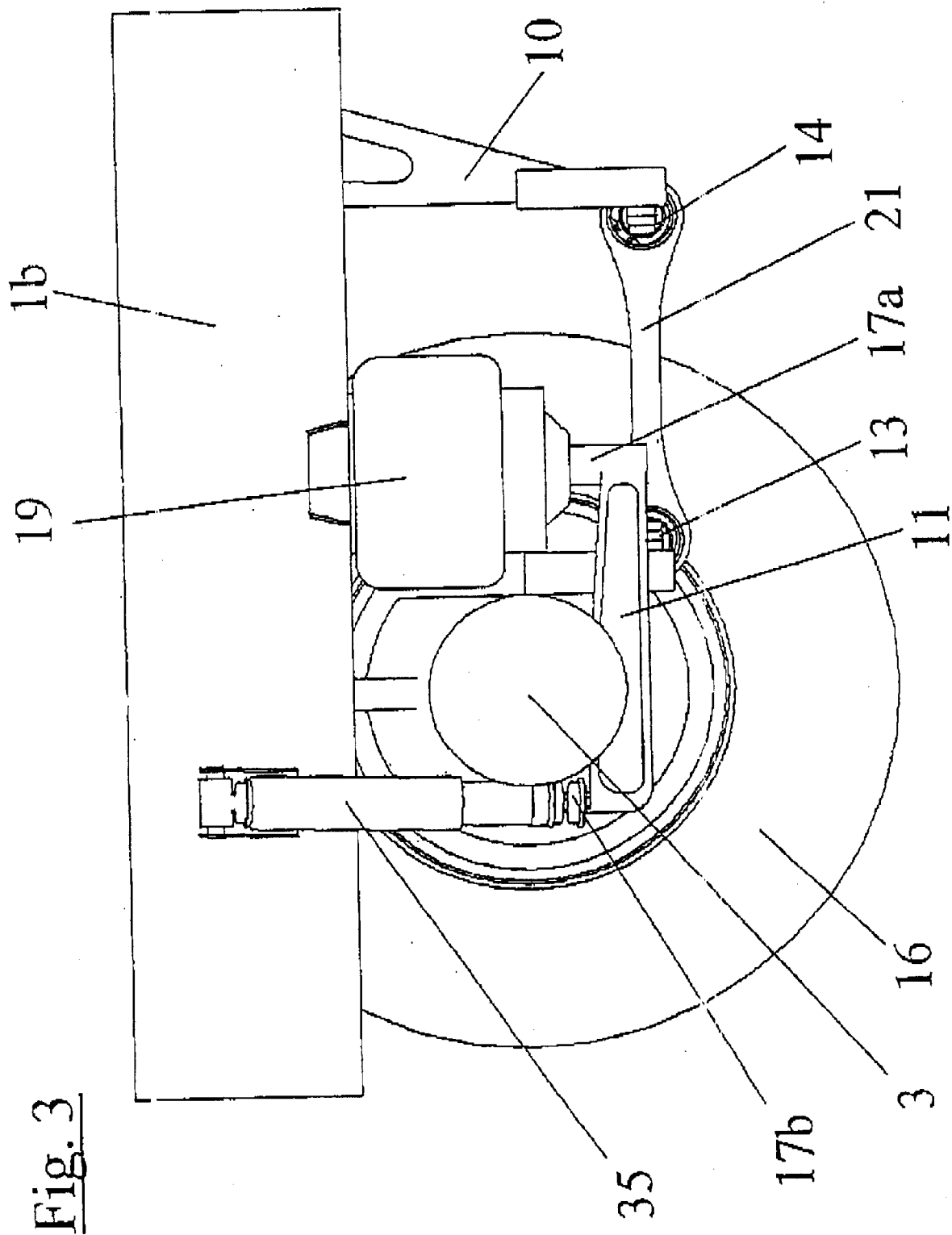
FIG. 3 is a side view of the axle suspension according to the present invention without the vehicle wheel that is the right-hand wheel in the direction of travel.

Referring to the drawings in particular, FIGS. 1 through 3 show the axle suspension according to the present invention on a utility vehicle chassis, not shown here, which is provided with longitudinal frames 1a, 1b. The longitudinal frames 1a and 1b are arranged at laterally spaced locations from one another and are firmly connected to one another by the crossbeams 2a, 2b. The longitudinal frames 1a, 1b and the crossbeams 2a, 2b are parts of the vehicle chassis. The vehicle axle 3, which is connected to the longitudinal frames 1a, 1b and to one of the crossbeams 2b via a four-point connecting rod 4, is located under the longitudinal frames 1a and 1b. Furthermore, the vehicle wheels 15 and 16 are fastened to the vehicle axle 3. The four-point connecting rod 4 has a total of four joints 5, 6, 7 and 8, with two joints 6, 8 each being fastened, as was described above, to the vehicle frame and two joints 5, 7 to the vehicle axle. The joints fastened to the vehicle axle and to the vehicle frame are arranged at spaced locations from one another in the transverse direction of the vehicle and are designed as molecular joints.

Figure 4:
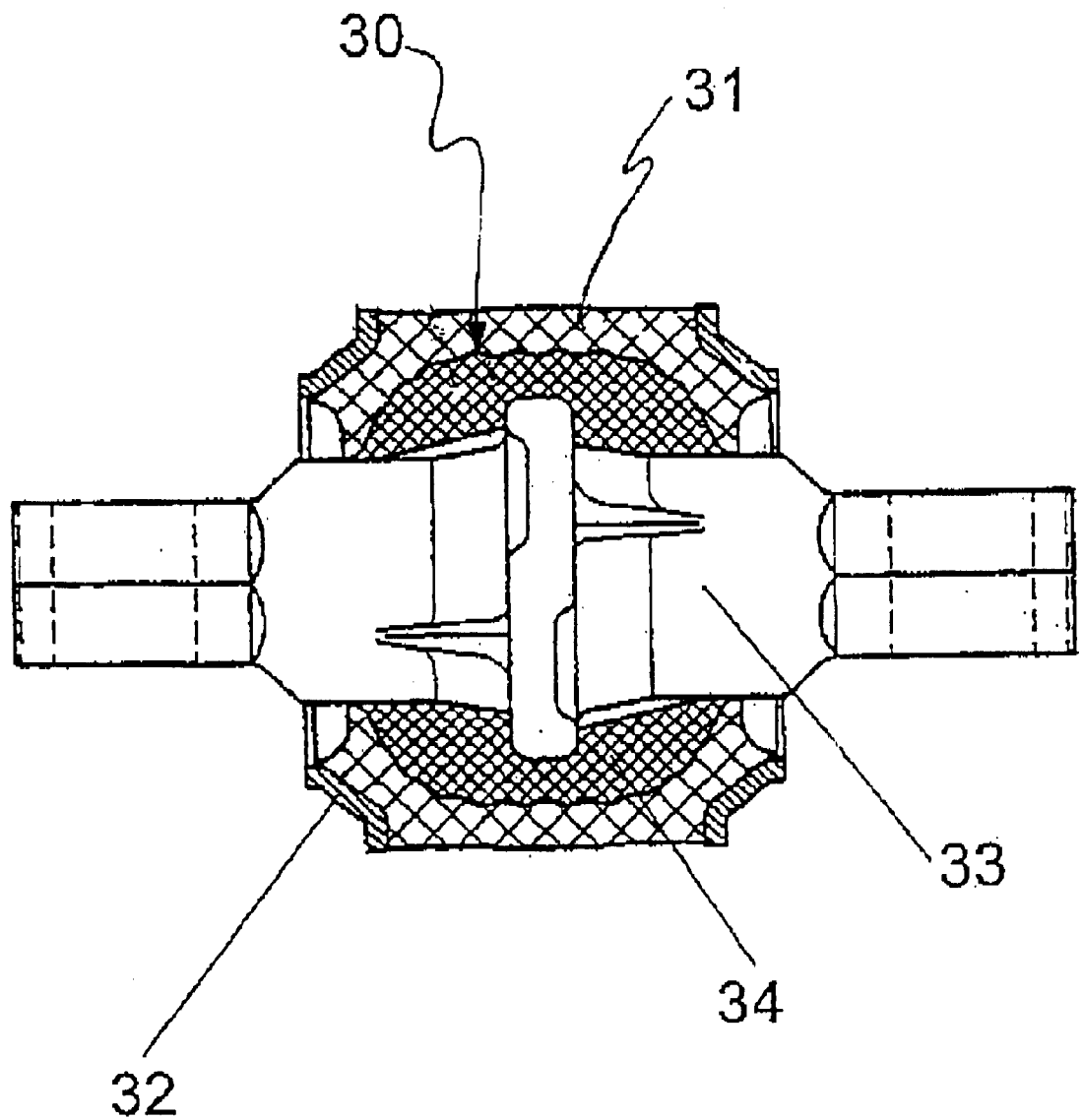
FIG. 4 is a sectional view of a molecular joint used for the axle suspension according to the present invention.

A molecular joint is, in principle, a joint as it is shown as an example as a ball-and-socket joint in FIG. 4. The molecular joint comprises here an inner joint ball 30, a housing 32 surrounding the joint ball as well as an elastomer 31 arranged between the joint ball 30 and the housing 32. In the exemplary embodiment according to FIG. 4, the joint ball 30 has a two-part design, consisting of an inner, metallic joint axis 33 and an outer ball 34 made in one piece with it from an elastomer. Other embodiments of a molecular joint may be a joint ball 30 made entirely of metal or have a cylindrical inner part instead of a ball. Such molecular joints can be correspondingly adapted to the loads acting on the joint by selecting the elastomer arranged between the joint ball 30 and the housing 32. In addition, recesses, which affect the characteristics of the joint in a specific manner, may be provided at least in some areas within the elastomer and/or the housing or on the inner part of the joint. For example, molecular joints may have a lower damping in one direction and a correspondingly greater damping in at least one direction that is offset in relation to that direction.

The views in FIGS. 1 through 3 also show that the vehicle axle 3 has a connection to a crossbeam 2b, which is formed by an axle strut 21, which is in turn mounted in a carrier bracket 10 on one side. This axle strut contains one molecular joint 13, 14 on each side, the molecular joint 13 being articulated under the vehicle axle 3 and the molecular joint 14 being accommodated in the carrier bracket 10. The molecular joints 5, 6, 7, 8, 13, and 14 have, in principle, the above-described design and make it possible to absorb both longitudinal as well as vertical forces and angulations (cardanics), which are caused by the movements of the vehicle axle 3. Redundancy of the kinematic degrees of freedom is prevented by the use of the molecular joints, so that a more optimal forward coordination can be brought about in terms of the dynamics of the chassis in the vertical and lateral directions.

A longitudinal beam 11 and 12 each is fastened to the vehicle axle 3 on each side of the vehicle for the indirect connection of the vehicle axle to the vehicle chassis. In the embodiment being shown, these longitudinal beams 11, 12 establish the connection to the vehicle chassis via a spring assembly unit 19, 20 each or a shock absorb 35, 36 each.

Respective mounts 17a, 17b and 18a, 18b are present on the longitudinal beams 11 and 12 for mounting the spring assembly units 19, 20 and the shock absorbers 35, 36, respectively.

This leads to a reduction in the number of the components usually used in prior-art axle designs and thus reduces the amount of parts to be stocked and the assembly times for the axle design according to the present invention.

Figure 5:
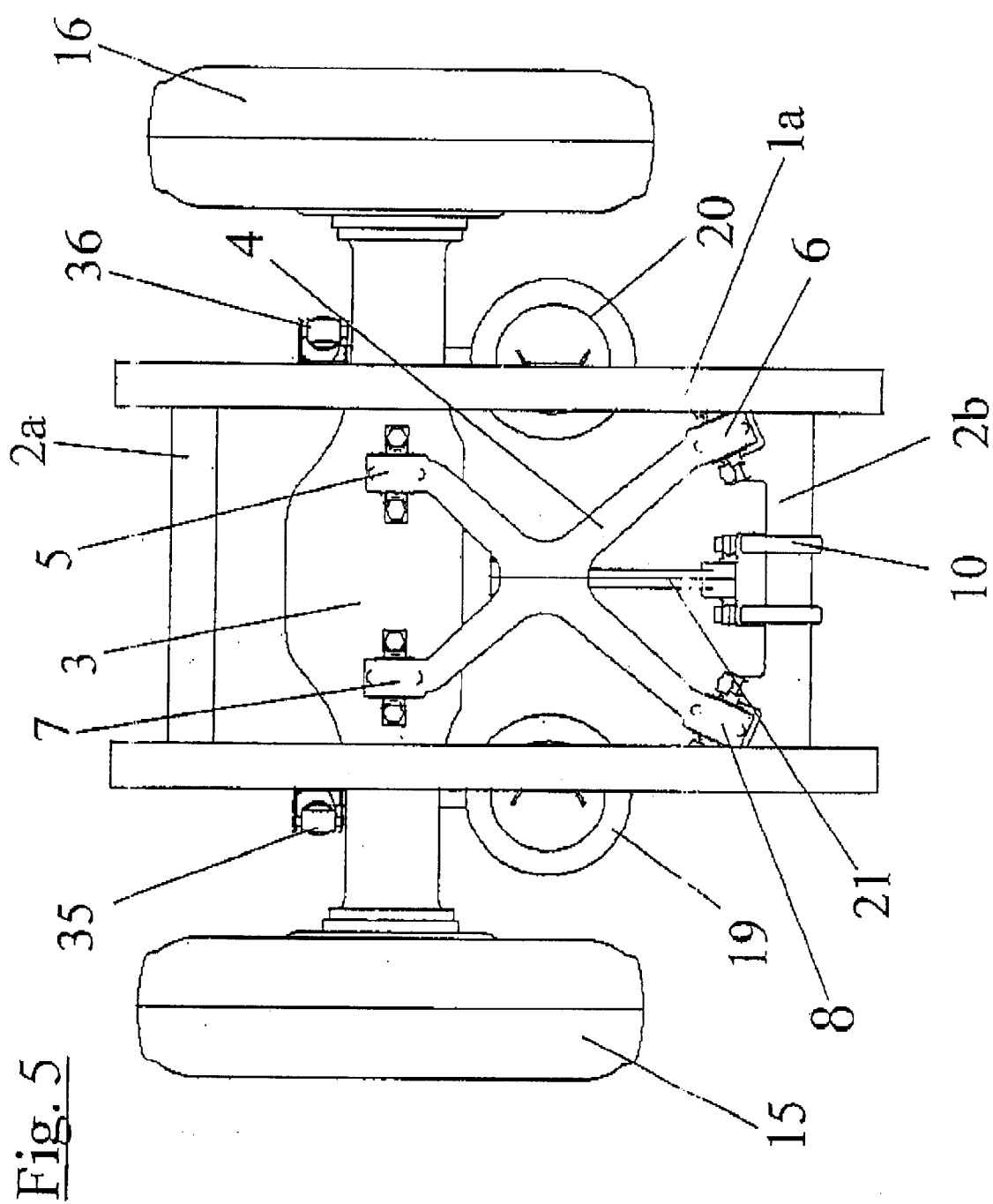
FIG. 5 is a top view of an axle suspension according to the present invention.

The top view of an exemplary embodiment of the axle design according to the present invention in FIG. 5 shows the position of the four-point connecting rod 4 as well as its articulation points on the body and on the vehicle axle 3.

It is, of course, possible to arrange three, four or more such spring elements instead of the two spring assembly units shown in an axle suspension according to the present invention and to arrange the spring assembly units 19, 20 in front of or behind the vehicle axle 3 when viewed in the direction of travel.

Figure 6:
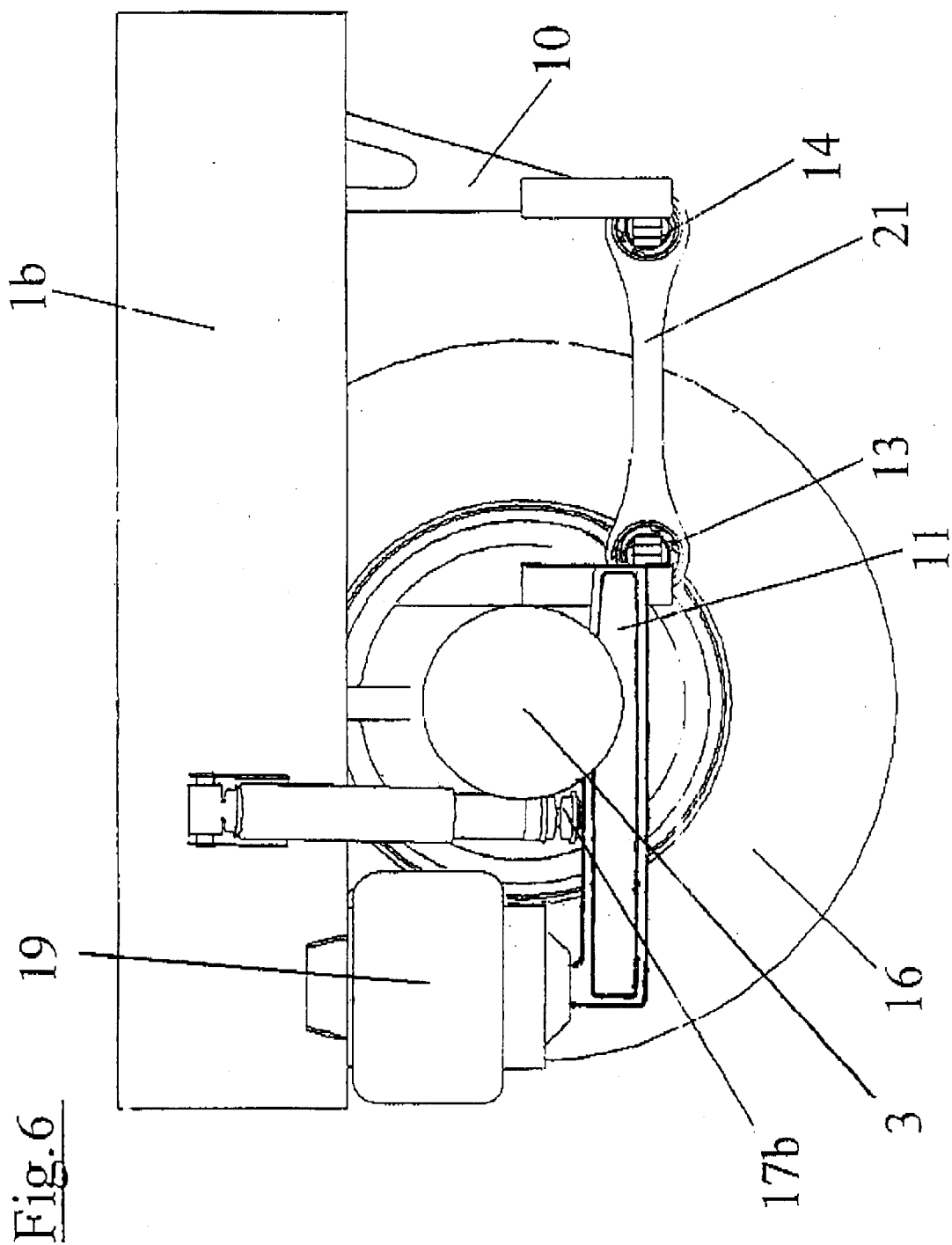
FIG. 6 is a view similar to that of FIG. 3, but showing the spring assembly unit mounted behind the vehicle axle.

The view FIG. 6 shows an embodiment similar to that of FIG. 3, but where the spring assembly unit 19 is located behind the vehicle axle 3.

Figure 7:
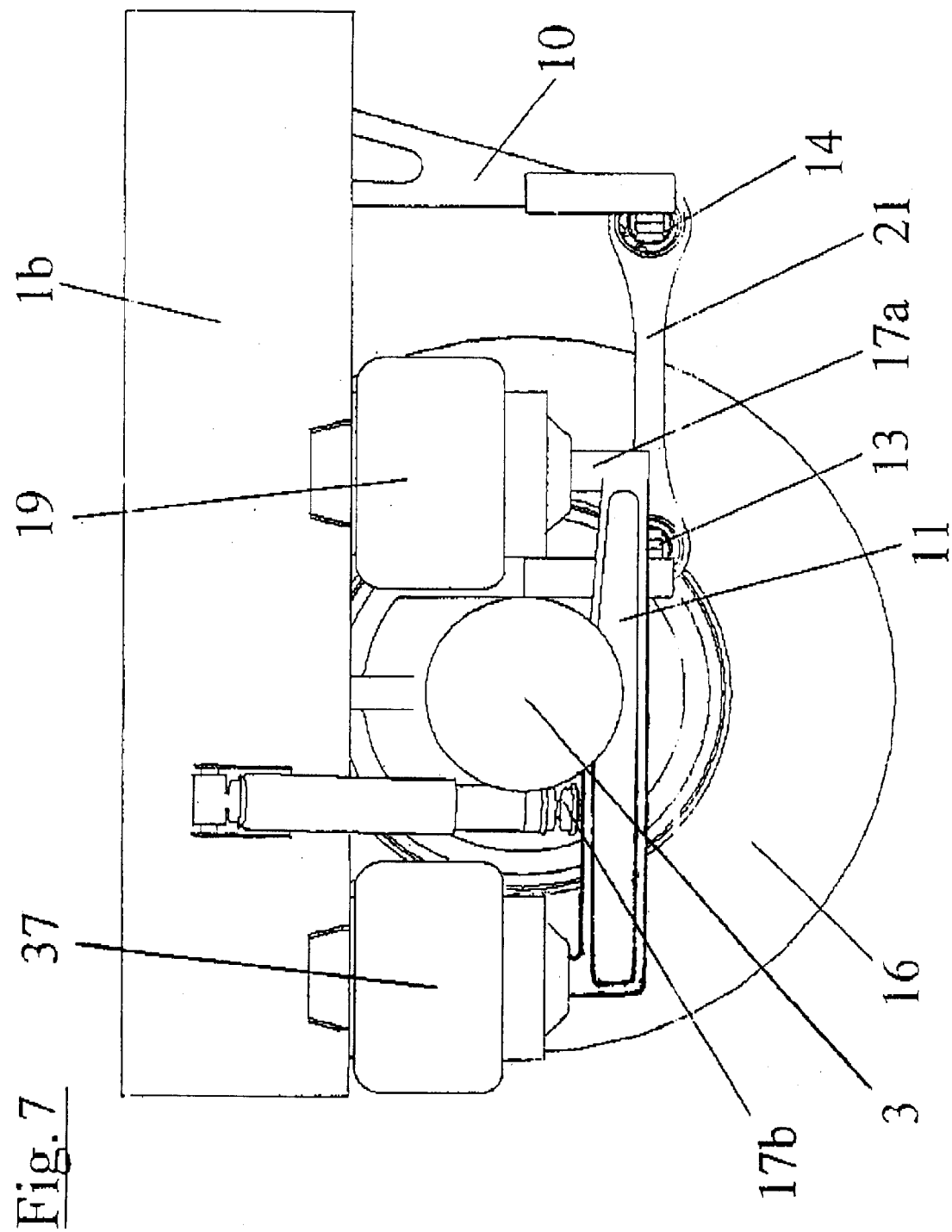
FIG. 7 is a view similar to that of FIG. 3, but showing spring assembly units both in front of and behind the vehicle axle.

The view FIG. 7 shows an embodiment similar to that of FIG. 3, but with spring assemblies 19, 37 located both in front of and behind the vehicle axle.

While specific embodiments of the invention have been shown and described in detail to illustrate the application of the principles of the invention, it will be understood that the invention may be embodied otherwise without departing from such principles.

What is claimed is:

1. An air-cushioned utility vehicle axle suspension and vehicle chassis for a rigid axle the suspension and chassis comprising:

a vehicle chassis with longitudinal frame members arranged at laterally spaced locations from one another, said longitudinal frame members being firmly connected to each other via crossbeams;

a support bracket connected to a middle portion of one of said crossbeams and extending downwardly to a support bracket lower end;

a twistable four-point connecting rod connected to a top of the vehicle axle and connected to the vehicle chassis via two joints for each connection, said joints for each connection being arranged at spaced locations from one another in a longitudinal direction of the vehicle;

a first side spring assembly unit between the vehicle axle and the vehicle body;

a second side spring assembly unit for spring suspension between the vehicle axle and the vehicle body; and an axle strut for axle guiding, said axle strut extending from below the axle approximately in a vehicle middle and in vehicle longitudinal direction and connecting the vehicle axle to support bracket lower end in a vertically movable manner.

2. An axle suspension and chassis in accordance with claim 1, further comprising:

a first side longitudinal beam arranged on the vehicle axle, a second side longitudinal beam arranged on the vehicle axle;

a mount for one of said spring assembly units or for a shock absorber, said mount being provided on said first side longitudinal beam; and a mount for another of said spring assembly units or for a shock absorber, said mount being provided on said second side longitudinal beam.

3. An axle suspension and chassis in accordance with claim 2, wherein said mounts for said spring assembly units or for said shock absorbers include joints.

4. An axle suspension and chassis in accordance with claim 3, wherein said joints are ball-and-socket joints.

5. An axle suspension and chassis in accordance with claim 1, further comprising molecular joints on both ends of said axle strut, one of said molecular joints being connected to said support bracket, and the other of said molecular joints being connected to the vehicle axle on a side of the vehicle axle located opposite said four-point connecting rod.

6. An axle suspension and chassis in accordance with claim 1, wherein one of said spring assembly units is arranged in front of or behind said vehicle axle.

7. An axle suspension and chassis in accordance with claim 1, further comprising:

a rear first side spring assembly unit for spring suspension between the vehicle axle and the vehicle body, said rear first side spring assembly unit being arranged behind the vehicle axle; and a rear second side spring assembly unit for spring suspension between the vehicle axle and the vehicle body, said rear second side spring assembly unit being arranged behind the vehicle axle, wherein sad first side spring assembly unit and said second side spring assembly unit are arranged in front of said vehicle axle.

8. An axle suspension for rigid axles of vehicles and vehicle chassis, the axle suspension and chassis comprising:

a vehicle chassis with longitudinal frame members arranged at laterally spaced locations from one another, said longitudinal frame members being firmly connected to each other via crossbeams;

a support bracket connected to a middle portion of one of said crossbeams and extending downward in a vertical direction to a support bracket lower end;

a four-point connecting rod with a first two joint connection above the vehicle axle to the vehicle axle and with a second two joint connection above the vehicle axle directly connecting the four-point connecting rod to the vehicle chassis, said first two joint connection being arranged at a spaced location from said second two joint connection;

a first spring assembly on a first vehicle side located for spring suspension between the vehicle axle and the vehicle body;

a second spring assembly on a second vehicle side located for spring suspension between the vehicle axle and the vehicle body; and an axle strut for axle guiding, said axle strut extending in the longitudinal direction of the vehicle substantially centrally with respect to said first vehicle side and said second vehicle side and connecting the vehicle axle to the support bracket lower end in a vertically movable manner.

9. An axle suspension and chassis in accordance with claim 8, further comprising:

a first side longitudinal beam arranged on the vehicle axle;

a second side longitudinal beam arranged on the vehicle axle;

a mount for one of said spring assembly units or for a shock absorber, said mount being provided on said first side longitudinal beam; and a mount for another of said spring assembly units or for a shock absorber, said mount being provided on said second side longitudinal beam.

10. An axle suspension and chassis in accordance with claim 9, wherein said mounts for said spring assembly units or for said shock absorbers include joints.

11. An axle suspension and chassis in accordance with claim 10, wherein said joints are ball-and-socket joints.

12. An axle suspension and chassis in accordance with claim 8, further comprising molecular joints on both ends of said axle strut, one of said molecular joints being connected to said support bracket, and the other of said molecular joints being connected to the vehicle axle on a side of the vehicle axle located opposite said four-point connecting rod.

13. An axle suspension and chassis in accordance with claim 8, wherein one of said spring assembly units arranged in front of or behind said vehicle axle.

14. An axle suspension and chassis in accordance with claim 8, further comprising:

a rear first side spring assembly unit for spring suspension between the vehicle axle and the vehicle body, said rear first side spring assembly unit being arranged behind the vehicle axle; and a rear second side spring assembly unit for spring suspension between the vehicle axle and the vehicle body, said rear second side spring assembly unit being arranged behind the vehicle axle, wherein said first side spring assembly unit and said second side spring assembly unit are arranged in front of said vehicle axle.

15. An air-cushioned utility vehicle axle, axle suspension and vehicle chassis combination, the combination comprising:

a rigid vehicle axle;

a vehicle chassis with longitudinal frame members arranged at laterally spaced locations from one another, said longitudinal frame members being firmly connected to each other via crossbeams;

a support bracket connected to a middle portion of one of said crossbeams and extending in a vertical direction downwardly to a support bracket lower end;

a twistable four-point connecting rod connected to a top of the vehicle axle via two joints and connected directly to the vehicle chassis via two joints, said joints for each connection being arranged at spaced locations from one another in a longitudinal direction of the vehicle;

a first side spring assembly unit for spring suspension between the vehicle axle and the vehicle body;

a second side spring assembly unit for spring suspension between the vehicle axle and the vehicle body; and an axle strut for axle guiding, said axle strut extending below the axle approximately in a vehicle middle and in a vehicle longitudinal direction and connecting the vehicle axle to said support bracket lower end in a vertically movable manner.

16. A combination in accordance with claim 15, further comprising:

a first side longitudinal beam arranged on the vehicle axle;

a second side longitudinal beam arranged on the vehicle axle;

a mount for one of said spring assembly units or for a shock absorber, said mount being provided on said first side longitudinal beam; and a mount for another of said spring assembly units or for a shock absorber, said mount being provided on said second side longitudinal beam.

17. An axle suspension and chassis in accordance with claim 16, further comprising molecular joints on both ends of said axle shut, one of said molecular joints being connected to said support bracket, and the other of said molecular joints being connected to the vehicle axle on a lower side of the vehicle axle located opposite said four-point connecting rod.

18. An axle suspension and chassis in accordance with claim 17, further comprising:

a rear first side spring assembly unit for spring suspension between the vehicle axle and the vehicle body, said rear first side spring assembly unit being arranged behind the vehicle axle; and a rear second side spring assembly unit for spring suspension between the vehicle axle and the vehicle body, said rear second side spring assembly unit being arranged behind the vehicle axle, wherein said first side spring assembly unit and said second side spring assembly unit are arranged in front of said vehicle axle.

* * * * *